July 29, 1941.  C. L. EKSERGIAN  2,250,988

TRUCK AND BRAKE ARRANGEMENT THEREFOR

Filed July 19, 1939

INVENTOR
Carolus L. Eksergian
BY John P. Dartrop
ATTORNEY

Patented July 29, 1941

2,250,988

UNITED STATES PATENT OFFICE 2,250,988

TRUCK AND BRAKE ARRANGEMENT THEREFOR

Carolus L. Eksergian, Detroit, Mich., assignor to Budd Wheel Company, Philadelphia, Pa., a corporation of Pennsylvania Application July 19, 1939, Serial No. 285,271

9 Claims. (Cl. 188—153)

The present invention relates to brakes.

More specifically, it relates to brakes of the disk type, wherein brake shoes cooperate with the face or faces of a disk, and concerns in particular an adaptation of such type of brake to trucks of the kind disclosed in the application Serial No. 280,771, filed June 23, 1939.

In trucks of this kind, the vehicle wheels are provided with independent springs, so that the wheels are independently resiliently mounted and have a certain ˙ree of independence and freedom to adjust themselves individually to the rails or the roadway. This in turn makes it practically impossible to employ the same type of disk brake which is used in the somewhat similar trucks which are at present standard, wherein no such independent movement of the wheels is provided, and nothing interferes with the conventional location of the brakes.

The present invention accomplishes its purpose by locating the brake disks outside the wheels, instead of between them, as formerly customary. This makes it desirable to modify both the operating means for the brakes and their mounting; and a preferred embodiment of the new structure is disclosed by way of example in the accompanying drawing and described in the present specification.

In the drawing.

In all the figures, similar elements are designated by the same reference characters.

Figure 1:
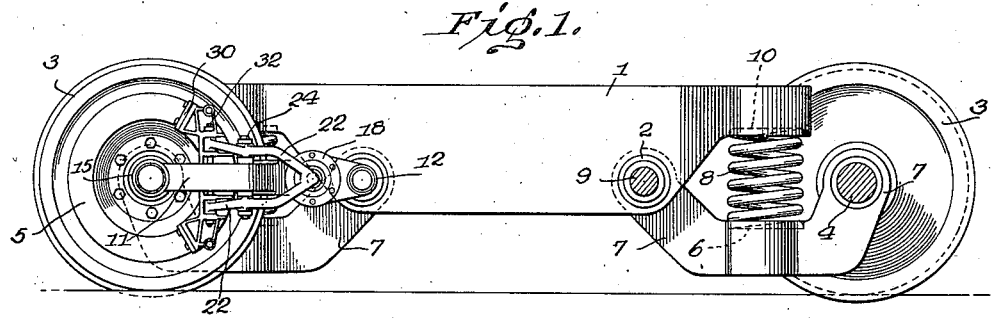
Fig. 1 is a side elevational view, parts being shown in section, of a wheel truck having the brakes outside the wheels, the section being taken on the line 1—1 of Fig. 2 looking in the direction of the arrows.
Figure 2:
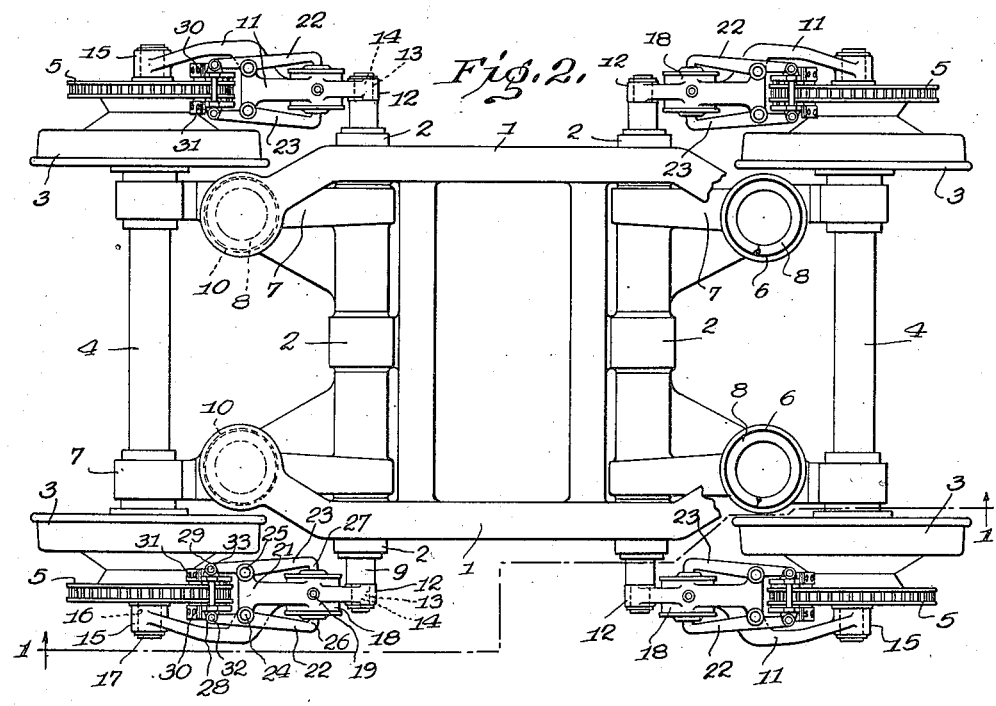
Fig. 2 is a plan view of the truck, parts being broken away.

Referring to the drawing, 1 designates the frame of the truck, in which are mounted the fixed axles 9, passing through the lugs 2. Upon each axle 9 are mounted two arms or brackets 7 which are pivotally supported by said axle, and which in turn support the wheel axle 4 carrying a wheel 3 at each end. Preferably the axles 4 are "universally" mounted in said brackets, so that the axles may tilt slightly, to permit the wheels to follow irregularities of the rails.

Each bracket 7 has a suitable receptacle 6 for the lower end of a spring 8, whose upper end is mounted in a cooperating receptacle 10, four of which are provided, one at each corner of the frame 1, as indicated. The axles 4 do not rotate, and the wheels 3 are mounted on suitable bearings carried by the ends of the respective axles. This structure of the wheel truck itself, with the independently resiliently mounted wheels, is disclosed and claimed in the above identified case, and forms no part of the present invention, but is disclosed herein solely to illustrate how the brake mechanism is constructed and operated.

The brake mechanism forming the basis of the present invention, comprises a brake disk 5, attached to each wheel 3 in any suitable way, for instance, by securing it to the wheel hub. Fig. 1 shows that these brake disks are located outside the wheels, instead of between them, as in the former type of truck wherein the wheels are not independently sprung.

In order to provide means for forcing the brake shoes against the faces of the brake disks 5, it is highly desirable, if not nearly essential, that such means should be capable of following the disks 5 in their up-and-down movements, caused by the motions of the wheels 3 to which they are rigidly secured. This is readily accomplished by the brake yoke 11 which at one end 12 has a bore 13 fitting pivotally on the reduced end 14 of the axle 9, and at its other end 15 has a similar bore 16 fitting pivotally on a shaft 17, which may be a reduced extension of the axle 4, extending outward from the brake disk 5. The yoke 11 is thus held in proper relation to the axle 9 and the brake disk 5.

In that portion of the yoke 11 adjacent the end 12, is located a double-acting brake cylinder 18 which houses two pistons, that move away from one another when compressed air or other fluid under pressure is admitted to the cylinder 18 through the port 19, so as to enter between said pistons. The end of one of these pistons is shown at 20, Fig. 3.

Figure 3:
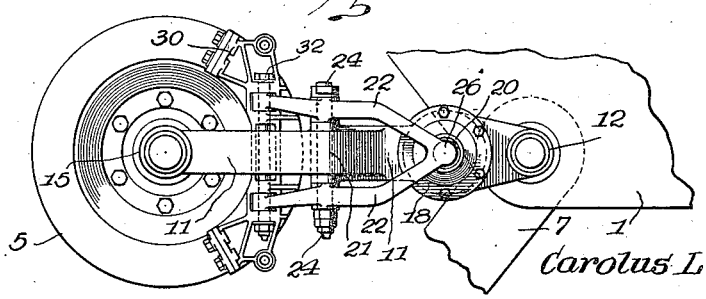
Fig. 3 is a fragmentary elevation, on an enlarged scale, showing the brake mechanism in detail.

At a suitable location in the yoke, there may be an enlarged portion 21, which provides pivotal support for the brake levers 22 and 23, which are mounted on the bolts 24 and 25. The end 26 of the lever 22 bears against the outer end of piston 20 as shown in Fig. 3, and the corresponding end 27 of the lever 23 bears against the outer end of the other piston (not shown), so that when the said pistons are actuated by the pressure medium in the cylinder 18, said ends 26 and 27 of the respective levers will move away from one another, thus causing the levers to pivot about the bolts 24 and 25, to bring their other ends, 28 and 29, closer together.

The brake shoes 30 and 31 are carried by the said ends 28 and 29, being pivotally attached thereto by the bolts 32 and 33, so that the shoes may adjust themselves to the faces of the brake disks. These brake shoes may be of any suitable kind, and are here shaped as sectors of rings. Their precise shape and structure do not constitute an essential feature of the present invention.

In operation, it will be seen that the brake arm 11 will follow the corresponding brake disk 5 in its vertical motions, produced by the rise and fall of the wheel 3 to which it is attached. This correspondence of motion is produced by reason of the fact that the arm 11 is pivoted about substantially the same axis as the adjacent bracket 7.

To avoid binding, the bore 16 may be made slightly larger than the diameter of the shaft 17 over which it is engaged, so that the slight shift out of alinement that occurs when the axle 4 tilts will not cause any difficulty. There is also a slight increase in the axial distance between the axles 14 and 4 when the axle 4 tilts, and this must also be accommodated. This effect is also a slight one, and may likewise be provided for by a sufficiently loose fit between axle 17 and bore 16.

When compressed air is admitted to the space between the brake pistons, through the port 19, the said pistons will be forced apart, thus causing the brake shoes 30 and 31 to engage the opposite faces of the brake ring 5. Since both pistons are identical in size, and are subjected to the same air pressure, their braking forces will also be identical. Levers 22 and 23 are likewise identical, hence they automatically will maintain equality between the pressures exerted on opposite faces of the brake ring 5, and hence produce equalized braking on the two faces of the ring, resulting in uniform dissipation of the kinetic energy of the vehicle, especially since all the wheels have identical brakes thereon, supplied with the same air pressure.

While only one particular embodiment of the invention has been disclosed in detail, it must be remembered that the drawing is highly diagrammatic and is presented solely for illustrating the principles underlying the invention. Many features may be modified in detail in various ways, and the invention is of course capable of many other embodiments, so that the same is not restricted to the features disclosed herein, but is defined solely in the following claims.

I claim:

1. In a wheel truck, a brake disk secured to the outside of one of the wheels, a unitary rigid arm pivoted at one end to the truck frame and having its other end pivotally mounted substantially in axial alinement with the said wheel, and a brake shoe with fluid pressure actuating means therefor each carried by said arm, to cooperate with the rotary brake disk.

2. In a wheel truck having sprung wheels, a brake disk secured to the outside of one of the wheels, to rotate therewith, a unitary rigid arm pivoted at one end to the truck frame, and having its other end pivotally maintained substantially in axial alinement with the said wheel, and a brake shoe with fluid pressure actuating means therefor each carried by said arm, to cooperate with the rotary brake disk.

3. In a wheel truck, a rotary brake disc outside of, and secured to, one of the wheels, a unitary rigid arm pivoted at one end to the truck frame and having its other end pivotally mounted substantially in axial alinement with the said wheel, a pair of brake shoes for engagement with opposite sides of said disc, a brake cylinder carried by said arm, said cylinder having two opposed pistons therein, and lever means actuated thereby to cause the shoes to bear against the rotary brake disc.

4. In a wheel truck, a brake disk secured to the outside of one of the wheels, a unitary rigid arm pivoted at one end to the truck frame and having its other end pivotally mounted substantially in axial alinement with the said wheel, a brake cylinder attached to said arm, and containing a piston, a brake shoe for engaging said disc, and means connecting said shoe to the piston whereby actuation of the piston will force the shoe against the rotary brake disk.

5. In a wheel truck having sprung wheels, a brake disc element secured to one of the wheels, to rotate therewith, a unitary rigid arm pivoted at one end to the truck frame, and having its other end pivotally maintained substantially in axial alinement with the said wheel, said arm having fluid pressure actuated means built thereinto, a brake shoe, and lever means connecting the said shoe to the said pressure actuated means, to cause the shoe to bear against the rotary brake element.

6. In a wheel truck having independently sprung wheels mounted to swing about axes transverse to the truck frame and, a brake element secured to, and located outwardly beyond, one of the wheels, to rotate therewith, said wheel having a prolongation of its axle extending out beyond it, a rigid arm pivoted at one end to the truck in substantial alignment with the axis about the wheel swings, and having its other end pivotally supported on said prolongation, substantially in axial alinement with the said wheel, and a brake shoe with actuating means therefor including a lever and fluid pressure means for actuating said lever, carried by said arm, to cooperate with the rotary brake element.

7. In a wheel truck having sprung wheels, a brake disk secured to one of the wheels, to rotate therewith, an arm pivoted at one end to the truck, and having its other end maintained substantially in axial alinement with the said wheel, said arm having double-acting fluid pressure actuated means built thereinto, a pair of brake shoes, located adjacent opposite faces of the disk, and means connecting the said shoes to the said pressure actuated means, to cause the shoes to bear equally against the faces of the rotary brake disk.

8. In a wheel truck having sprung wheels, a brake disk secured to, and located beyond, one of the wheels, to rotate therewith, said wheel having a prolongation of its axle extending out beyond it, an arm pivoted at one end to the truck, and having its other end pivotally supported on said prolongation, substantially in axial alinement with the said wheel, a double-acting brake cylinder built into the said arm, and brake shoes with actuating means therefor, carried by said arm, to cooperate with the cylinder and with the rotary brake disk, to force the shoes against the opposite faces of the same when fluid pressure is applied to the cylinder.

9. In a wheel truck, a wheel and axle assembly connected at its opposite ends to the truck frame for independent vertical movement with respect thereto, said mounting being on a common transverse pivot extending outwardly beyond the sides of the truck frame, the axle of said wheel and axle assembly also having an end extension projecting beyond the adjacent wheel, a brake disc secured to the outside of said wheel and having lateral braking faces adjacent its periphery, a brake supporting arm hingedly connected at its opposite ends, respectively, to said axle extension and the transverse pivot extension, said arm supporting brake shoes arranged to engage the opposite lateral braking faces of said disc, and actuating means therefor including fluid pressure means connected to act with equal force on the shoes to apply the brake.

CAROLUS L. EKSERGIAN.